United States Patent [19]

Nobuchi et al.

[11] Patent Number: 5,269,540
[45] Date of Patent: Dec. 14, 1993

[54] METAL-COVERED SEALING GASKET HAVING A SOFT, HEAT RESISTANT, EXPANDABLE CORE

[75] Inventors: Susumu Nobuchi, Kobe; Takahisa Ueda; Akira Hashimoto, both of Sanda, all of Japan

[73] Assignee: Nippon Pillar Packing Co., Ltd., Osaka, Japan

[21] Appl. No.: 860,570

[22] Filed: Mar. 30, 1992

Related U.S. Application Data

[63] Continuation of Ser. No. 487,119, Mar. 2, 1990, abandoned.

[30] Foreign Application Priority Data

Mar. 13, 1989 [JP] Japan .................. 1-28992[U]

[51] Int. Cl.$^5$ ............................................. F16J 15/12
[52] U.S. Cl. ............................. 277/229; 277/DIG. 6
[58] Field of Search ............ 277/229, 234, 230, 235 B, 277/DIG. 6; 252/378 R

[56] References Cited

U.S. PATENT DOCUMENTS

| | | | |
|---|---|---|---|
| 2,126,716 | 8/1938 | Balff | 277/235 B X |
| 3,673,088 | 6/1972 | Clements | 252/7 X |
| 3,753,923 | 8/1973 | Wada | 252/378 R |
| 3,824,297 | 7/1974 | Wada | 252/378 R |
| 4,156,533 | 5/1979 | Close et al. | 277/229 |
| 4,317,575 | 3/1982 | Cavicchio | 277/DIG. 6 |
| 4,477,094 | 10/1984 | Yamamoto et al. | 277/234 X |
| 4,539,046 | 9/1985 | McAloon et al. | 252/378 R X |
| 4,549,741 | 10/1985 | Usher et al. | 277/236 |
| 4,715,987 | 12/1987 | Rittler | 252/315.2 X |
| 4,756,561 | 7/1988 | Kawata et al. | 277/DIG. 6 X |
| 4,762,641 | 8/1988 | Denton et al. | 252/378 R |
| 4,786,670 | 11/1988 | Tracy et al. | 277/DIG. 6 |
| 4,946,737 | 8/1990 | Lindeman et al. | 428/283 |

FOREIGN PATENT DOCUMENTS 447460  5/1936  United Kingdom ......... 277/DIG. 6

*Primary Examiner*—William A. Cuchlinski, Jr.
*Assistant Examiner*—Scott W. Cummings
*Attorney, Agent, or Firm*—Jones, Tullar & Cooper

[57] ABSTRACT

The present invention relates to a metal-covered gasket in which a soft core member (2, 12, 22, 32, 42, 52) containing unexpanded or expanded vermiculite is covered with a metallic sheet (3, 13A, 13B, 23A, 23B, 33A, 33B, 43, 53A, 53B). There are provided good sealing properties by the soft core member mainly composed of inorganic fibers and treated unexpanded vermiculite the expansion amount and expansion force of which are increased due to ion exchange by treatment with chemicals, or by the soft core member solely made of expanded vermiculite. Reinforcing metallic sheets (44, 54) for restraining the vermiculite from transversely sliding and for further improving the entire shape retention may be embedded in the soft core member or laminated on the surface thereof.

10 Claims, 4 Drawing Sheets

METAL-COVERED SEALING GASKET HAVING A SOFT, HEAT RESISTANT, EXPANDABLE CORE

This is a continuation of co-pending application Ser. No. 07/487,119, filed on Mar. 2, 1990, now abandoned.

BACKGROUND OF THE INVENTION

1. Field of the Invention

The present invention relates to a gasket disposed at the connection part of members used under relatively severe conditions. More specifically, the present invention relates to a metallic sheet covered gasket suitably used as a gasket applied for a connection part in the engine or its exhaust system of a motor vehicle, which is subjected to great variations of temperature and to which a mechanical shock such as vibration or the like is repeatedly applied.

2. Description of Related Art

In the engine of a motor vehicle, there are several connection parts which are subjected to great variations of temperature and to which a mechanical shock such as vibration or the like is repeatedly applied. Examples of such connection parts include the connection part for connecting the cylinder block to the cylinder head, the connection part for connecting the exhaust manifold forming the engine exhaust system, to the cylinder block, the connection part for connecting the exhaust manifold to the catalyst converter, the connection part for connecting the catalyst converter to the muffler, and the like. Gaskets interposed at such connection parts are required to always maintain good sealing properties even though they are used under the severe conditions mentioned above.

As the gasket used under such severe conditions, there is known a metal-covered gasket in which a soft core member made of heat-resisting fibers such as asbestos fibers, ceramic fibers or the like, or expanded graphite, is covered with a metallic sheet.

In such a metal-covered gasket, the soft core member is excellent in heat resistance and cushioning properties, while the metallic sheet enhances rigidity. Accordingly, this metal-covered gasket is considered to be very useful to provide excellent sealing properties, as a gasket used in the engine or the exhaust system.

However, when there is used the gasket having the soft core member made of asbestos fibers, ceramic fibers, expanded graphite or the like, the contact pressure of the connection part is decreased thereby deteriorating the sealing properties of the gasket due to heating by the exhaust gas, vibration of the engine and vibration transmitted from the road surface. Further, in a high-temperature zone, the cushioning properties of the gasket are poor to lower the fitness of the gasket to the connection surface. This also causes the sealing properties of the gasket to be lowered.

SUMMARY OF THE INVENTION

In view of the foregoing, the present invention is proposed with the object of providing a metal-covered gasket in which an improvement in sealing properties may be expected regardless of a low- or high-temperature zone.

It is another object, of the present invention to provide a metal-covered gasket capable of preserving resiliency to maintain good sealing properties, in spite of high compressive forces applied to the connection part.

To achieve the objects mentioned above, the metal-covered gasket in accordance with the present invention comprises: a heat-resisting expandable soft core member mainly composed of inorganic fibers and treated unexpanded vermiculite in which ions have been exchanged by treatment with chemicals; and a metallic sheet which covers the soft core member.

According to the metal-covered gasket mentioned above, the use of the treated unexpanded vermiculite eliminates negative expansion of the vermiculite in a low-temperature zone and improves the expansion coefficient (expansion amount) thereof in a high-temperature zone. Accordingly, regardless of the low- or high-temperature zone, there occurs no gap between the metallic covering sheet and the soft core member, thereby preventing the contact pressure at the connection part from being lowered. Further, the cushioning properties for effectively relaxing a mechanical shock such as vibration or the like may be assured because the treated unexpanded vermiculite expands with a great expansion coefficient even in the low-temperature zone. Moreover, the fitness of the metal-covered gasket to the bonding surface in both low- and high-temperature zones is improved to restrain the sealing properties from being lowered. Further, the inorganic fibers improve the heat resistance and serve as binders in the high-temperature zone, thereby improving the shape retention of the soft core member.

Since the metal-covered gasket of the present invention presents the effects mentioned above, it may be used, with considerably improved sealing properties, at a connection part in the engine or exhaust system of a motor vehicle which is subjected to great variations of temperature and to which a mechanical shock such as vibration or the like is repeatedly applied.

According to the present invention, the treated unexpanded vermiculite may be obtained by treatment with chemicals in which untreated unexpanded vermiculite is immersed in an aqueous solution containing sodium ions and/or ammonium ions.

The expansion amount and expansion force of such treated unexpanded vermiculite are considerably high, thereby to effectively improving the sealing properties of the metal-covered gasket.

In the metal-covered gasket mentioned above, ceramic fibers may be used as the inorganic fibers. In such a metal-covered gasket, the heat resistance may be particularly remarkable.

The metal-covered gasket in accordance with another embodiment of the present invention comprises a soft core member made of expanded vermiculite covered with a metallic sheet.

In the metal-covered gasket mentioned above, the density of the expanded vermiculite is high. Accordingly, the high resilient repulsion force of the soft core member provides good, sealing properties.

In the metal-covered gasket as mentioned above in which the soft core member contains vermiculite, reinforcing metallic sheets having raised pawl portions may be advantageously embedded in the soft core member, or reinforcing metallic sheets having pawls adapted to eat into the soft core member may be advantageously laminated on the surface of the soft core member directed to a compressing direction.

According to the arrangement mentioned above, the reinforcing metallic sheets restrain the vermiculite to which compressive force is applied, from transversely sliding. Further, the reinforcing metallic sheets restrain the metal-covered gasket from being distorted, thereby improving the shape retention thereof.

DETAILED DESCRIPTION OF THE PREFERRED EMBODIMENTS

Figure 1:
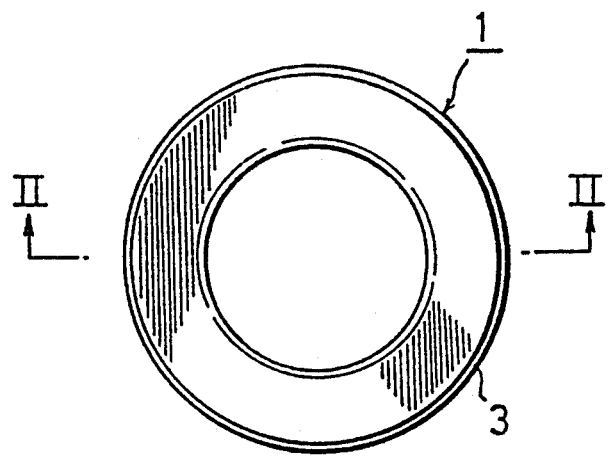
FIG. 1 is a front view of a metal-covered gasket in accordance with an embodiment of the present invention.
Figure 2:
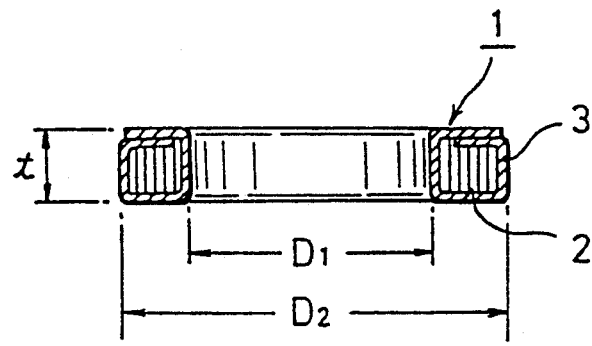
FIG. 2 is a section view taken along the line II—II in FIG. 1.

A metal-covered gasket 1 in FIGS. 1 and 2 is made in the form of an annulus, and comprises a soft core member 2 covered with a metallic covering sheet 3.

The metallic covering sheet 3 is made of stainless steel sheet (for example, SUS304).

The soft core member 2 is made of a heat-resisting expandable material mainly consisting of 30 to 60% by weight of unexpanded vermiculite treated with chemicals, and 20 to 40% by weight of ceramic fibers as the inorganic fibers. Preferably, the heat-resisting expandable material consists of 50% by weight of unexpanded vermiculite, and 30% by weight of ceramic fibers. The soft core member 2 further contains 5 to 20% by weight of an organic binder. As the organic binder, an acrylate polymer or cellulose pulp may be used. Preferably, 20% by weight of the organic binder is contained.

The unexpanded vermiculite is a treated unexpanded vermiculite obtained by treating an untreated unexpanded vermiculite with an aqueous solution of sodium ammonium hydrogen phosphate. The untreated unexpanded vermiculite contains cations apt to be exchanged with Na+ ions, and cations apt to be exchanged with NH4+ ions. Accordingly, when the untreated unexpanded vermiculite is immersed in the aqueous solution mentioned above, an ion exchange is carried out with the aqueous solution containing both these ions. By such an ion exchange, the vermiculite is brought to treated unexpanded vermiculite presenting an effectively increased expansion amount and expansion force. As the aqueous solution for treating the vermiculite, there may be used an aqueous solution of diammonium hydrogen phosphate or sodium dihydrogen phosphate. The NH4+ ions in the former aqueous solution, or the Na+ ions in the latter aqueous solution are exchanged with the ions in the untreated unexpanded vermiculite.

The ceramic fibers in the soft core member 2 improve the heat resistance thereof. Particularly, in a high-temperature zone where the organic binder perfectly disappears, the ceramic fibers serve as binders to improve the shape retention of the soft core member 2.

As the organic binder, an acrylate polymer, cellulose pulp or the like may be preferably used. It is required to use 5 to 20% by weight of the organic binder. If less than 5% by weight of the organic binder is used, the resiliency of the soft core member 2 at an ambient temperature is insufficient.

The following description will discuss as an example of measurement, the thermal coefficient of expansion of unexpanded vermiculite.

One thousand grs. of untreated unexpanded vermiculite from South Africa was immersed in each of three different aqueous solutions as shown in Table 1 at an ambient temperature for 120 hours. After being washed with running water, each vermiculite was dried at 105° C. for 2 hours, thus preparing treated unexpanded vermiculite. After each treated unexpanded vermiculite had been heated at a predetermined heating temperature for 30 minutes, its thermal coefficient of expansion was measured. The measurement results are shown in FIG. 3.

TABLE 1

| Treating Chemical | Treating Aqueous Solutions | | |
|---|---|---|---|
| | Sodium ammonium hydrogen phosphate | Ammonium dihydrogen phosphate | Sodium dihydrogen phosphate |
| Amount(g) | 150 | 150 | 400 |
| Water(g) | 850 | 850 | 800 |

Figure 3:
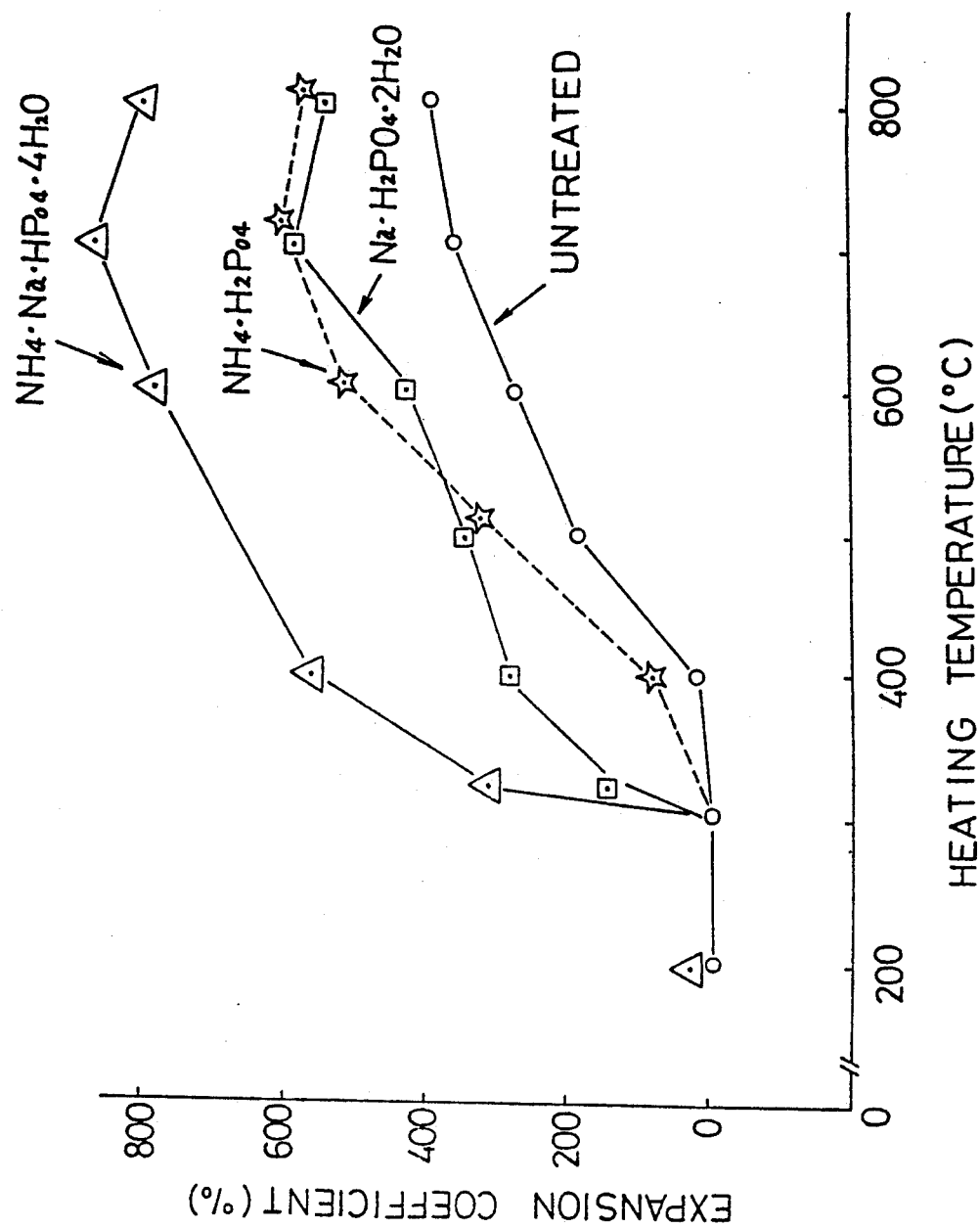
FIG. 3 is a test graph illustrating the relationship between the temperature and the thermal expansion of vermiculite.

As apparent from FIG. 3, the untreated unexpanded vermiculite presented a negative expansion due to creep in a low-temperature zone around 300° C., while the treated unexpanded vermiculite presented no such negative expansion. The treated unexpanded vermiculite treated with the aqueous solution of sodium ammonium hydrogen phosphate presented, in a high-temperature zone, an expansion coefficient (expansion amount) higher (greater) than that of the treated unexpanded vermiculite treated with the aqueous solution of ammonium dihydrogen phosphate or sodium dihydrogen phosphate.

The following description will discuss by way of example a procedure for manufacturing the metal-covered gasket 1 as shown in FIGS. 1 and 2.

There is manufactured, according to a combing-out method, a heat-resisting expandable sheet containing 50% by weight of treated unexpanded vermiculite treated with an aqueous solution of sodium ammonium hydrogen phosphate, 30% by weight of ceramic fibers, and 20% by weight of an organic binder. The heat-resisting expandable sheet thus formed has a thickness of 3 mm and a density of 0.7 g/cm$^3$. This sheet is cut into tape-like pieces. A tape-like cut piece is wound in the form of an eddy, causing the piece to be made in the form of a ring. The ring-like piece is pressed, thereby to prepare a ring-like heat-resisting expandable member, i.e., the soft core member 2, having a height of about 4 mm. The metallic covering sheet 3 having a thickness of 0.15 mm made of a stainless steel sheet (SUS304) is wound on the surface of the soft core, member 2. Thus, the soft core member 2 is covered with the metallic covering sheet 3 as shown in FIG. 2. There is thus formed the metal-covered gasket 1 having an inner diameter $D_1$ of 49 mm, an outer diameter $D_2$ of 58 mm, and a thickness t of 5 mm.

A test was conducted on the metal-covered gasket 1 thus formed as to the sealing properties thereof. That is, with the metal-covered gasket 1 interposed at the connection part for connecting the catalyst converter to the exhaust manifold in the exhaust system of a 4-cycle gasoline engine, the sealing properties of the metal-covered gasket 1 were checked. There was repeated, several times, a test according to a pattern in which the engine was continuously operated and stopped while the operation mode was suitably changed from a low-speed operation to a high-speed operation with vibration applied to the connection part by a vibrating feeder. According to the test results, it was made sure that the metal-covered gasket 1 has excellent sealing properties.

This shows that the treated unexpanded vermiculite and the inorganic fibers restrain the negative expansion in a low-temperature zone from 200° to 300° C. and improve the expansion coefficient (expansion amount) in a high-temperature zone not less than 600° C. More specifically, this prevents the occurrence of a gap between the metallic covering sheet 3 and the soft core member 2 regardless of the low- or high-temperature zone. This prevents the contact pressure at the connection part from being lowered. It can be considered that the excellent sealing properties mentioned above are provided because the treated unexpanded vermiculite expands with a great expansion coefficient even in the low-temperature zone so that a mechanical shock such as vibration or the like is effectively absorbed and relaxed. The excellent sealing properties mentioned above are also provided because the inorganic fibers serve as binders in the high-temperature zone, assuring the shape retention of the soft core member 2.

Figure 4:
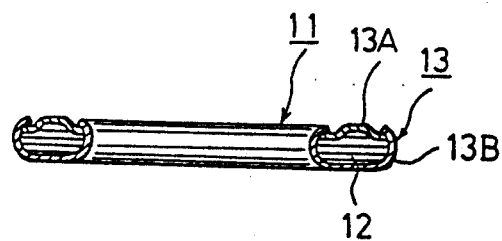
FIG. 4 is a section view of another example of the metal-covered gasket.

A metal-covered gasket 11 shown in FIG. 4 has a soft core member 12 formed by laminating a plurality of annular disks punched from the heat-resisting expandable sheet having a thickness of 3 mm and density of 0.7 g/cm$^3$ mentioned above. The soft core member 12 is covered with a pair of upper and lower metallic covering sheets 13A, 13B. The metallic covering sheet 13B has a U-shaped section. The metallic covering sheet 13A closes the opening of the metallic covering sheet 13B with the peripheries of the metallic covering sheet 13A engaged with the insides of the peripheries of the opening of the metallic covering sheet 13B.

Figure 5A:
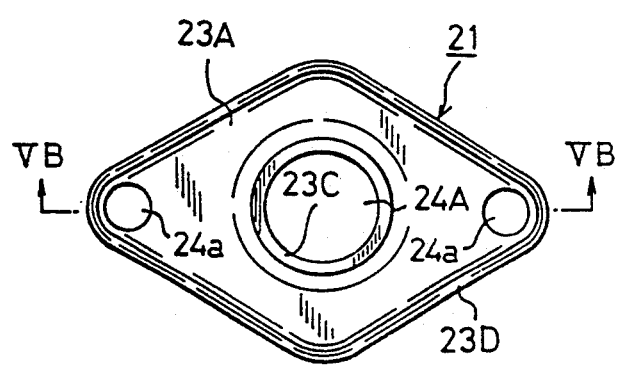
FIG. 5A is a plan view of a further example of the metal-covered gasket.
Figure 5B:
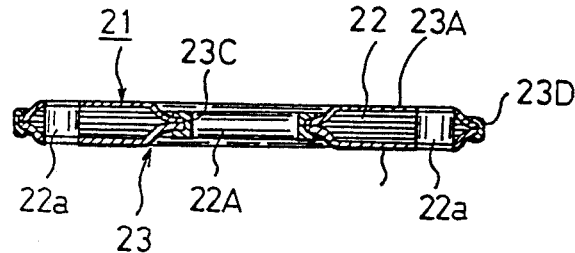
FIG. 5B is a section view taken along the line VB—VB in FIG. 5A.

A metal-covered gasket 21 shown in FIGS. 5A and 5B has a soft core member 22 formed by laminating a plurality of heat-resisting expandable sheets, each sheet having a through-hole 24A and through-holes 24a respectively formed in the center and left- and right-hand sides of the sheet. This soft core member 22 is covered with disk-like metallic covering sheets 23A, 23B which are vertically symmetrically disposed. The inner and outer peripheries of the metallic covering sheets 23A, 23B are securely connected by metallic grommets 23c, 23D, each having a U-shaped section, which hold these peripheries from the outside.

Figure 6:
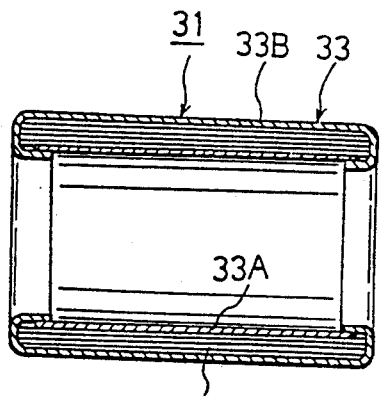
FIG. 6 is a section view of still another example of the metal-covered gasket.

A metal-covered gasket 31 shown in FIG. 6 has a soft core member 32 formed by winding, in a plurality of laminations, a heat-resisting expandable sheet on the outer periphery of a cylindrical metallic covering member 33A. The exposed surface of the soft core member 32 is covered with a cylindrical metallic covering member 33B the ends of which are turned to overlap the ends of the cylindrical metallic covering member 33A.

Another example of the metal-covered gasket having an appearance similar to that of the metal-covered gasket of the present invention shown in FIG. 1, 2, 3, 4, 5 or 6, has the soft core member 2, 12, 22 or 32 solely made of expanded vermiculite. The expanded vermiculite has high density. Accordingly, the metal-covered gasket using the expanded vermiculite as the soft core member is provided with good sealing properties because of high resilient repulsion force of the soft core member.

According to the metal-covered gasket of the present invention, regardless of the type of the soft core member, there are instances where the soft core member is distorted due to the reception of a strong compressive force so that the vermiculite transversely slides. If the vermiculite transversely slides, the restoring force of the vermiculite is lowered, so that the soft core member cannot be provided with such a resilient repulsion force as to provide good sealing properties.

Figure 7:
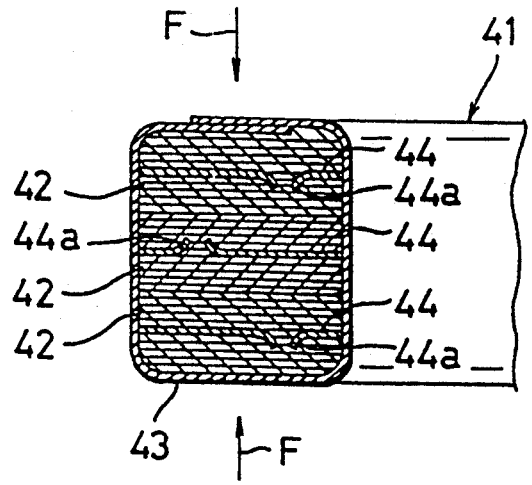
FIG. 7 is a section view of main portions of the metal-covered gasket in accordance with another embodiment of the present invention.

FIG. 7 shows a metal-covered gasket 41 in accordance with another embodiment of the present invention, which overcomes the problem mentioned above.

Figure 8:
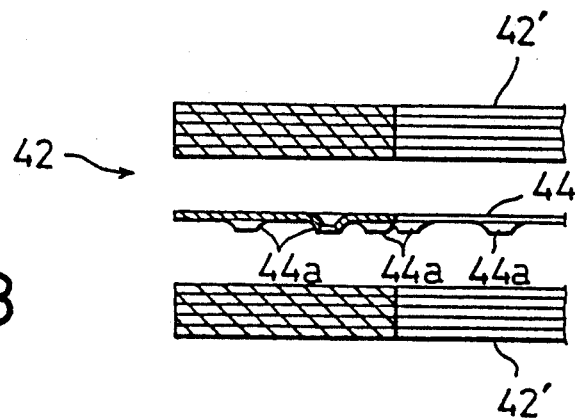
FIG. 8 is a view with portions in section of a portion of the metal-covered gasket in FIG. 7, illustrating the step of embedding a reinforcing metallic sheet.

Reinforcing metallic sheets 44 are embedded in a soft core member 42 covered with a metallic sheet 43. The reinforcing metallic sheets 44 have raised pawl portions 44a and have faces directed to a compressing direction (shown by an arrow F). in FIG. 7, the soft core member 42 has three layers, in each of which the reinforcing metallic sheet 44 is embedded. As shown in FIG. 8, the soft core member 42 is arranged such that each reinforcing metallic sheet 44 is sandwiched by two heat-resisting expandable sheets (or expanded vermiculite sheets) 42'. The laminated body of the reinforcing metallic sheet 44 and two sheets 42' is pressed, causing the laminated body to be made in the form of a ring. Thus, there is formed the soft core member 42 in which the reinforcing metallic sheets 44 are embedded. The raised pawl portions 44a may be formed by punching the reinforcing metallic sheets 44. In the metal-covered gasket 41 having the arrangement mentioned above, the raised pawl portions 44a of the reinforcing metallic sheets 44 eat into the soft core member 42, to thereby prevent the vermiculite from transversely sliding when a compressive force is applied in the direction shown by an arrow F. It is a matter of course that the reinforcing metallic sheets 44 serve as reinforcing members for restraining the metal-covered gasket 41 from being distorted.

Figure 9:
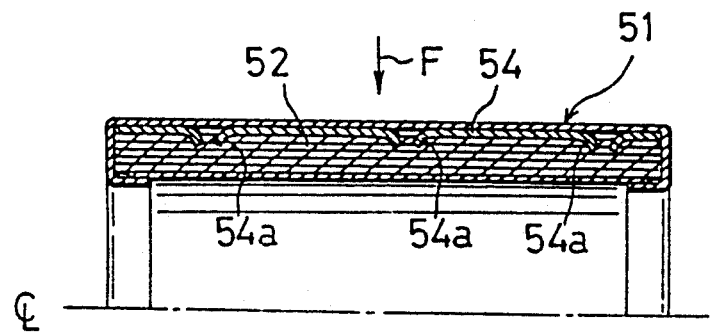
FIG. 9 is a section view of the metal-covered gasket in accordance with a further embodiment of the present invention.

FIG. 9 shows, in section, a metal-covered gasket 51 in accordance with a further embodiment of the present invention. In the metal-covered gasket 51, reinforcing metallic sheets 54 are laminated on the surface of a soft core member 52 which receives a compressive force F. The reinforcing metallic sheets 54 also have raised pawl portions 54a. These raised pawl portions 54a are raised in such a direction as to eat into the soft core member 52. The soft core member 52 together with the reinforcing metallic sheets 54 is covered with metallic sheets 53A, 53B. These metallic sheets 53A, 53B have the same arrangement as that of the metallic sheets 33A, 33B in FIG. 6. In the metal-covered gasket 51, the reinforcing metallic sheets 54 prevent the vermiculite from transversely sliding and assure a strong resisting force against the distortion of the metal-covered gasket 51.

What is claimed is:

1. A gasket for high temperature applications, comprising:
   a heat resistant, expandable soft core member composed of inorganic fibers and treated and unexpanded vermiculite containing sodium ions and ammonium ions from immersion in an aqueous solution of sodium ammonium hydrogen phosphate containing the sodium ions and the ammonium ions, said treated vermiculite being such that it starts expansion at at least 275° C. and expands to more than twice its original volume at at least 300° C., with no negative expansion over the entire temperature range; and a metallic sheet covering the soft core member.

2. A metallic sheet covered gasket according to claim 1, wherein the inorganic fibers are ceramic fibers.

3. A metallic sheet covered gasket according to claim 2, wherein the soft core member contains 30 to 50% by weight of the treated unexpanded vermiculite.

4. A metallic sheet covered gasket according to claim 3, containing 20 to 40% by weight of the ceramic fibers.

5. A metallic sheet covered gasket according to claim 1, wherein the soft core member contains 30 to 50% by weight of the treated unexpanded vermiculite.

6. A metallic sheet covered gasket according to claim 1, wherein reinforcing metallic sheets having raised pawl portions are embedded in the soft core member, said reinforcing metallic sheets having surfaces directed in a compressing direction.

7. A metallic sheet covered gasket according to claim 1, wherein reinforcing metallic sheets having pawl adapted to eat into the soft core member, are laminated on the surface of said soft core member which is directed in a compressing direction.

8. A metallic sheet covered gasket comprising a soft core member made of expanded vermiculite having a treated and unexpanded vermiculite containing sodium ions and ammonium ions from immersion in an aqueous solution of sodium ammonium hydrogen phosphate containing the sodium ions and the ammonium ions, said treated vermiculite being such that it starts expansion at at least 275° C. and expands to more than twice its original volume at at least 300° C., with no negative expansion over the entire temperature range; and a metallic sheet which covers said soft core member.

9. A metallic sheet covered gasket according to claim 8, wherein reinforcing metallic sheets having raised pawl portions are embedded in the soft core member, said reinforcing metallic sheets having surfaces directed in a compressing direction.

10. A metallic sheet covered gasket according to claim 8, wherein reinforcing metallic sheets having pawls adapted to eat into in the soft core member, are laminated on the surface of said soft core member which is directed in a compressing direction.

* * * * *

UNITED STATES PATENT AND TRADEMARK OFFICE
CERTIFICATE OF CORRECTION

PATENT NO. : 5,269,540

DATED : December 14, 1993

INVENTOR(S) : Susumu Nobuchi et al

It is certified that error appears in the above-identified patent and that said Letters Patent is hereby corrected as shown below:

Claim 7, column 8, line 2, "pawl" should be "pawls".

Claim 10, column 8, line 24, "in" should be deleted.

Signed and Sealed this

Twenty-fourth Day of May, 1994

Attest:

BRUCE LEHMAN

*Attesting Officer*     *Commissioner of Patents and Trademarks*